(No Model.)

B. T. LOOMIS.
Reversible Filter.

No. 227,800.   Patented May 18, 1880.

Witnesses:
Geo. A. Boyden
A. C. Eader

Inventor:
Benjamin T. Loomis
By his Atty
Chas. B. Mann

UNITED STATES PATENT OFFICE.

BENJAMIN T. LOOMIS, OF BALTIMORE, MARYLAND.

REVERSIBLE FILTER.

SPECIFICATION forming part of Letters Patent No. 227,800, dated May 18, 1880.

Application filed March 29, 1880. (No model.)

*To all whom it may concern:*

Be it known that I, BENJAMIN T. LOOMIS, a citizen of the United States, residing at the city of Baltimore, State of Maryland, have invented certain new and useful Improvements in Reversible Filters; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention relates to an improvement in that class of reversible filters which are attached to the nozzle of a water-pipe or hydrant.

The object of the invention is to provide a filter of simple and cheap construction which will be readily and thoroughly cleansed of all impurities upon reversal.

The invention will first be described, and then designated in the claim.

Figure 1:
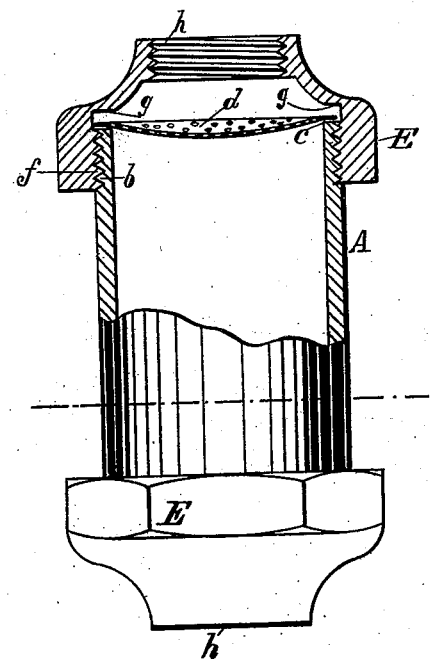
Figure 2:
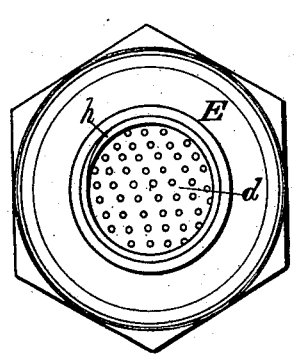
Figure 3:
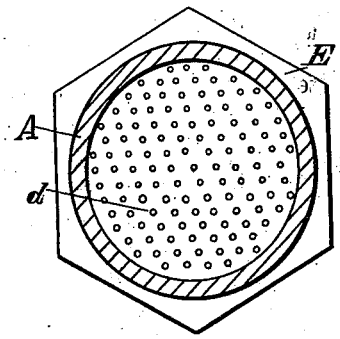

Figure 1 is a side view, partly in section. Fig. 2 is an end view. Fig. 3 is a cross-section.

The letter A designates the case or body of the filter, which is a cylinder with straight sides. Each end is provided exteriorly with a screw-thread, *b*. The ends of the cylinder are squared off, so as to form a seat, *c*, for the perforated plates *d*, one of which rests against each end.

The couplers E are each provided interiorly with a screw-thread, *f*, adapted to receive the end of the cylinder, and a shoulder, *g*, between which and the end or seat *c* the perforated plate is secured. The coupler is also provided with a screw-thread, *h*, for attachment to the nozzle of a hydrant. Thus the coupler serves to retain the parts of the filter intact, as well as for its attachment to a water-pipe.

As each end of the filter is provided with the same kind of a perforated plate and coupler, one serves as a nozzle, while the other is attached to the hydrant or water-pipe.

By the construction shown several important advantages result. In the first place the part of the perforated plate exposed for the passage in and out of the water is as large as the largest part of the filter-case, and, having its seat on the end of the case, the water to be filtered may pass through the plate and straight through the filtering material and out the opposite plate. As the course of the water is a direct one, all parts of the filtering material will, on the reversal of the filter, be washed out completely, there being no hinderance whatever such as is found in those filters where the perforated plate rests on an annular shoulder projecting inward from the wall of the case, such shoulder reducing the inlet and outlet; or, in other words, the filter-case is larger than the part of the perforated plate exposed for the passage of the water.

Filters of the class which have the feature referred to afford lodgment in their interior enlarged part for impurities, which, not being in the line of a direct or straight course, are not acted on in a way to be expelled when the filter is reversed, and consequently such filters soon become choked and inoperative.

Another advantage resulting from this construction is that the perforated plate may have at each end sufficient room for movement between the seat *c* and the shoulder *g*—say for a space of one-eighth of an inch—so that on the reversal of the filter the perforated plate will slide over the space mentioned, thus releasing the compression and allowing the filter material to shift position within the case, thereby loosening all its parts and enabling it to be effectually freed from impurities.

Having described my invention, I claim and desire to secure by Letters Patent of the United States—

A reversible filter for attachment to the nozzle of a hydrant, consisting of the straight-sided cylinder A, having a coupler, E, attached at each end, so that the end of the cylinder shall form the seat *c*, and a space be left between the said seat and the shoulder *g* on the coupler, whereby the part of the perforated plate exposed for the passage of water is as large as the largest part of the cylinder, and the perforated plate has, upon the reversal of the cylinder, room for movement, as and for the purpose set forth.

In testimony whereof I affix my signature in presence of two witnesses.

BENJAMIN T. LOOMIS.

Witnesses:
CHAS. B. MANN,
W. A. NUMSEN.